(12) United States Patent
Lörch et al.

(10) Patent No.: US 10,190,464 B2
(45) Date of Patent: Jan. 29, 2019

(54) EXHAUST AFTERTREATMENT DEVICE FOR AFTERTREATMENT OF EXHAUST OF AN INTERNAL COMBUSTION ENGINE

(71) Applicant: AUDI AG, Ingolstadt (DE)

(72) Inventors: Henning Lörch, Neckarsulm (DE); Wolfgang Keicher, Erlenbach (DE)

(73) Assignee: AUDI AG, Ingolstadt (DE)

( * ) Notice: Subject to any disclaimer, the term of this patent is extended or adjusted under 35 U.S.C. 154(b) by 78 days.

(21) Appl. No.: 15/202,180

(22) Filed: Jul. 5, 2016

(65) Prior Publication Data

US 2017/0009629 A1    Jan. 12, 2017

(30) Foreign Application Priority Data

Jul. 6, 2015   (DE) .................. 10 2015 008 718

(51) Int. Cl.
*F01N 3/10*   (2006.01)
*F01N 3/28*   (2006.01)
(Continued)

(52) U.S. Cl.
CPC ........ *F01N 3/2892* (2013.01); *B01F 3/04049* (2013.01); *B01F 5/0473* (2013.01);
(Continued)

(58) Field of Classification Search
CPC .. B01F 3/04049; B01F 5/0473; B01F 5/0616; B01F 5/0651; F01N 13/0093; F01N 13/0097; F01N 3/108; F01N 3/2066; F01N 3/2892; F01N 2240/20; F01N 2240/40; F01N 2340/02; F01N 2570/14; F01N 2610/02; F01N 2610/1453; Y02T 10/24
See application file for complete search history.

(56) References Cited

U.S. PATENT DOCUMENTS 5,209,062 A   5/1993   Vollenweider
7,438,876 B2  10/2008  Cichanowicz
(Continued)

FOREIGN PATENT DOCUMENTS

CN   101302957 A   11/2008
DE   0 468 919 A1   1/1992
(Continued)

OTHER PUBLICATIONS

Chinese Search Report dated Apr. 4, 2018 with respect to counterpart Chinese patent application 2016105170370.
(Continued)

*Primary Examiner* — Brandon D Lee
(74) *Attorney, Agent, or Firm* — Henry M. Feiereisen, LLC

(57) ABSTRACT

An exhaust aftertreatment device for aftertreatment of exhaust gas of an internal combustion engine includes an SCR catalyst for selective catalytic reduction, a feeding apparatus for adding a reductant at an entry point upstream of the SCR catalyst to the exhaust gas, and a mixing apparatus arranged in a flow direction of the exhaust gas between the entry point and the SCR catalyst. The mixing apparatus includes a mixing element and a catalyst element, with the catalyst element having in the flow direction of the exhaust gas a cross sectional area which is smaller than a cross sectional area of the mixing element.

12 Claims, 2 Drawing Sheets

(51) Int. Cl.
  *F01N 3/20* (2006.01)
  *F01N 13/00* (2010.01)
  *B01F 5/04* (2006.01)
  *B01F 5/06* (2006.01)
  *B01F 3/04* (2006.01)

(52) U.S. Cl.
  CPC .......... *B01F 5/0616* (2013.01); *B01F 5/0651* (2013.01); *F01N 3/108* (2013.01); *F01N 3/2066* (2013.01); *F01N 13/0093* (2014.06); *F01N 13/0097* (2014.06); *F01N 2240/20* (2013.01); *F01N 2240/40* (2013.01); *F01N 2340/02* (2013.01); *F01N 2570/14* (2013.01); *F01N 2610/02* (2013.01); *F01N 2610/1453* (2013.01); *Y02T 10/24* (2013.01)

(56) References Cited

U.S. PATENT DOCUMENTS

| | | | | |
|---|---|---|---|---|
| 2008/0295497 | A1* | 12/2008 | Kornherr | ............... B01D 53/90 60/286 |
| 2011/0011065 | A1 | 1/2011 | Knuth | |
| 2011/0099978 | A1 | 5/2011 | Davidson et al. | |
| 2011/0146254 | A1* | 6/2011 | Yi | ...................... B01F 3/04049 60/310 |
| 2015/0052878 | A1 | 2/2015 | Qi | |
| 2015/0315943 | A1* | 11/2015 | Gschwind | ............. B01F 5/0616 422/180 |

FOREIGN PATENT DOCUMENTS

| | | |
|---|---|---|
| DE | 10 2008 003 044 A1 | 4/2009 |
| DE | 10 2010 014037 | 11/2010 |
| DE | 10 2010 018 105 A1 | 10/2011 |
| DE | 20 2012 011 764 U1 | 3/2013 |
| DE | 2 297 436 B1 | 11/2013 |

OTHER PUBLICATIONS

Translation of Chinese Search Report dated Apr. 4, 2018 with respect to counterpart Chinese patent application 2016105170370.

* cited by examiner

EXHAUST AFTERTREATMENT DEVICE FOR AFTERTREATMENT OF EXHAUST OF AN INTERNAL COMBUSTION ENGINE

CROSS-REFERENCES TO RELATED APPLICATIONS

This application claims the priority of German Patent Application, Serial No. 10 2015 008 718.5, filed Jul. 6, 2015, pursuant to 35 U.S.C. 119(a)-(d), the disclosure of which is incorporated herein by reference in its entirety as if fully set forth herein.

BACKGROUND OF THE INVENTION

The present invention relates to an exhaust aftertreatment device for aftertreatment of exhaust gas of an internal combustion engine.

The following discussion of related art is provided to assist the reader in understanding the advantages of the invention, and is not to be construed as an admission that this related art is prior art to this invention.

An exhaust aftertreatment device is provided to perform an aftertreatment procedure for exhaust gases produced by the internal combustion engine. As such, an exhaust aftertreatment device may also be referred to as emission control device. Exhaust produced by the internal combustion engine is fed to the exhaust aftertreatment device and flows there through. Exhaust is then released downstream of the exhaust aftertreatment device into the atmosphere for example.

The exhaust aftertreatment device includes an SCR catalyst by which a selective catalytic reduction of pollutants contained in the exhaust gas is executed. During selective catalytic reduction, in particular nitrogen oxides, also referred to as $NO_x$, e.g. nitrogen oxide (NO) or nitrogen dioxide ($NO_2$), are reduced. A reductant or reducing agent is hereby used to carry out the selective catalytic reduction. An example of a reductant includes ammonia ($NH_3$). However, since ammonia is difficult to handle, it is normally produced only in the exhaust aftertreatment device, in particular through thermolysis. For this purpose, the reductant in the form of a liquid urea is initially added by a reductant feeding device, situated upstream of the SCR catalyst, at an entry point into the stream of exhaust gas. The reductant mixes with the exhaust gas from the entry point onwards in downstream direction and flows together with the exhaust gas in the direction of the SCR catalyst and through it. The better the mixture or intermingling of reductant with the exhaust gas before entering the SCR catalyst, the more efficient the SCR catalyst operates. For that reason, it has been proposed to arrange a mixing device in flow direction between the entry point and the SCR catalyst in an attempt to provide a mixing of the reductant with the exhaust gas. The results were unsatisfactory however.

It would be desirable and advantageous to provide an improved exhaust aftertreatment device to obviate prior art shortcomings.

SUMMARY OF THE INVENTION

According to one aspect of the present invention, an exhaust aftertreatment device for aftertreatment of exhaust gas of an internal combustion engine includes an SCR catalyst for selective catalytic reduction, a feeding apparatus for adding a reductant at an entry point upstream of the SCR catalyst to the exhaust gas, and a mixing apparatus arranged in a flow direction of the exhaust gas between the entry point and the SCR catalyst, the mixing apparatus including a mixing element and a catalyst element, with the catalyst element having in the flow direction of the exhaust gas a cross sectional area which is smaller than a cross sectional area of the mixing element.

The present invention resolves prior art problems by providing a mixing apparatus which is configured to not only effect a mixture of reductant and exhaust gas but in addition to implement an aftertreatment of the exhaust gas via the catalyst element. The catalyst element is provided to transform the reductant in particular into a form that is best suitable for the SCR catalyst. In addition or as an alternative, the selective catalytic reduction may already take place, at least in part, in the catalyst element. Conditioning of the reductant is provided in particular when liquid urea is injected from which the actual reductant, e.g. ammonia, is produced during subsequent thermolysis. Thus, upstream of the SCR catalyst, the liquid urea is fully converted into ammonia already upstream of the SCR catalyst. As a consequence, the SCR catalyst operates increasingly with the actual reductant ammonia and not with the liquid urea and/or intermediary product, such as isocyanic acid (HNCO).

Since the catalyst element by itself is not capable to effect a thorough mixing of the reductant with the exhaust gas, the present invention pursues an approach which involves a mixing apparatus that combines both the catalyst element and the mixing element. The mixing element and the catalyst element may hereby be arranged in flow direction of the exhaust gas behind one another, or they may be arranged in flow direction in overlapping disposition, i.e. arranged in flow direction at least in some sections in a same position.

In accordance with the present invention, the catalyst element has in the flow direction of the exhaust gas a cross sectional area which is smaller than a cross sectional area of the mixing element. Thus, the catalyst element has a cross sectional area which is smaller than a throughflow area of an exhaust pipe in which the catalyst element is arranged. Exhaust flowing through the exhaust pipe is thus able to flow past the catalyst element. In addition or as an alternative, the mixing element has a cross sectional area which corresponds to the throughflow cross section of the exhaust pipe or is only slightly less. As a result, the mixing element touches part or all of a wall of the exhaust pipe, especially in circumferential direction in relation to the flow direction.

Immediately after introducing the reductant to the exhaust gas, the reductant should still be present mostly or advantageously entirely in liquid form. When using liquid urea, it can be described for example by the sum formula $(NH_2)_2CO \cdot 7H_2O$. After introduction, the reductant evaporates in accordance with the reaction equation $(NH_2)_2CO \cdot 7H_2O \Rightarrow (NH_2)_2CO + 7H_2O$. When the temperatures are high enough, thermolysis takes place according to the reaction equation $(NH_2)_2CO \Rightarrow HNCO + NH_3$. As a result, already part of the ammonia ($NH_3$) and isocyanic acid (HNCO) are produced. The isocyanic acid reacts at sufficiently high temperature with water or water vapor. This process is known as hydrolysis and can be expressed by the reaction equation $HNCO + H_2O \Rightarrow NH_3 + CO_2$. The actual selective catalytic reduction with the aid of produced ammonia is governed by the reaction equation $NO_2 + NO + 2\,NH_3 \Rightarrow 2\,N_2 + 3\,H_2O$.

As a consequence of adding the catalyst element, which is associated to the mixing apparatus, both hydrolysis and selective catalytic reduction can be shifted in part away from the SCR catalyst to the catalyst element so that the SCR catalyst is subject to less stress. Using the mixing apparatus in accordance with the present invention, reductant can be efficiently broken down by the catalyst element and at the same effectively mixed with the exhaust gas via the mixing element. Both the mixing element and the catalyst element form hereby a unitary structure, advantageously jointly with the exhaust pipe in which the mixing element and the catalyst element are arranged. As an alternative, the unitary structure of mixing element and catalyst element may also be constructed for placement into an existing exhaust pipe.

According to another advantageous feature of the present invention, the catalyst element can be arranged upstream or downstream of the mixing element. Basically, any disposition of the catalyst element in relation to the mixing element may be conceivable. While the catalyst element can be arranged downstream of the mixing element, it is currently preferred to place the catalyst element upstream of the mixing element. Thus, reductant injected by the feeding apparatus is able to first encounter the catalyst element where it then broken down. Downstream of the catalyst element, the mixing element can then impose a swirl upon the exhaust gas and/or reductant in relation to a main flow direction of the exhaust gas so as to realize an efficient thorough mixing action.

According to another advantageous feature of the present invention, the catalyst element can be directly secured to the mixing element. For example, the catalyst element may be secured exclusively to the mixing element and held by the mixing element with respect to the exhaust pipe. The mixing element may include a multiplicity of mixing vanes which may be connected on a radially outer side with respect to the flow direction to a restraining fin which bears upon an inner circumferential surface of the exhaust pipe and secured there. On their radially inner side, the mixing vanes may be secured directly to the catalyst element to hold it in place. As an alternative, the mixing vanes may have on the radially inner side a mount in which the catalyst element is arranged and secured.

According to another advantageous feature of the present invention, the mixing element can have at least one region to embrace the catalyst element and/or the mixing element can be sized to extend beyond the catalyst element with respect to a radial direction. The mixing element thus has with respect to the flow direction over its circumference at least one section of greater dimension in radial direction than the catalyst element. The mixing element especially surrounds the catalyst element in circumferential direction with at least one section or advantageously in its entirety. Securement of the catalyst element may hereby be realized with the aid of the mixing element, as described above.

According to another advantageous feature of the present invention, the mixing element can have a central mount for receiving the catalyst element. The central mount may be provided for example in a bracket for the catalyst element. When assembling the mixing apparatus, the catalyst element is placed in the central mount and then secured to the mixing element. Securement may be realized in any suitable manner. For example, the catalyst element may be secured to the mixing element or the bracket secured to the mixing element via a formfit and/or material joint. The mount is placed advantageously in midsection of the mixing element in relation to the flow direction of the exhaust gas.

As described above, the mixing element can include mixing vanes. The mixing vanes can extend in relation to the flow direction of the exhaust gas in radial direction outwards, in particular extending from the catalyst element. For example, the mixing vanes extend in radial direction up to an inner circumferential surface of the exhaust pipe in which the mixing element is arranged. Advantageously, the mixing vanes are profiled, i.e. provided in terms of flow dynamics with a profile. The mixing vanes are arranged such as to impose a swirl upon the passing exhaust gas and/or reductant, i.e. cause the exhaust gas and/or reductant to rotate in circumferential direction in relation to the flow direction or main flow direction of the exhaust gas.

According to another advantageous feature of the present invention, the catalyst element can have a round cross section and/or the mixing element can have a non-round cross section, e.g. oval cross section. Advantageously, the mixing element and its outer circumference are shaped to conform to an inner circumference of the exhaust pipe, in which the mixing element is placed. Advantageously, the cross section of the mixing element is sized to fully fill the exhaust pipe. The exhaust pipe may be non-round in cross section or have a non-round outer circumference.

Currently preferred is an oval cross section of the mixing element, whereas the catalyst element is round in cross section. The catalyst element can have a diameter which at a maximum is as great as the smallest dimensions of the mixing element in radial direction over its circumference. Currently preferred is however that the catalyst element has a smaller diameter. Exhaust gas and/or reductant can thus sweep over the entire circumference of the catalyst element and flow through the mixing element. A configuration of the mixing apparatus in this way limits any pressure loss and still realizes the afore-described benefits, despite the small cross section of the catalyst element.

According to another advantageous feature of the present invention, the catalyst element can be an SCR catalyst element. Thus, same reactions are performed in the catalyst element as in the SCR catalyst, in particular part of the hydrolysis and/or selective catalytic reduction.

According to another advantageous feature of the present invention, the reductant feeding apparatus can be oriented to point toward the catalyst element. As a result, the feeding apparatus is arranged such that the reductant is injected in the direction of the catalyst element. Advantageously, the feeding apparatus is oriented to point centrally toward the catalyst element so that the reductant is added to the exhaust gas such as to centrally impact the catalyst element.

According to another advantageous feature of the present invention, the feeding apparatus can have a spray cone which is enclosed by the catalyst element in the presence of at least one exhaust mass flow. The feeding apparatus injects the reductant into the exhaust gas in the form of a spray cone. The feeding apparatus is hereby arranged or oriented in such a way that the spray cone fully impacts upon the catalyst element in the presence of the at least one exhaust mass flow. Reductant injected by the feeding apparatus is thus substantially prevented from flowing past the catalyst element but rather flows through the catalyst element in its entirety or substantially in its entirety. The feeding apparatus is therefore advantageously arranged such that the spray cone in the presence of all exhaust gas mass flows encountered during normal operation of the feeding apparatus fully impacts the catalyst element or is enclosed by the catalyst element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
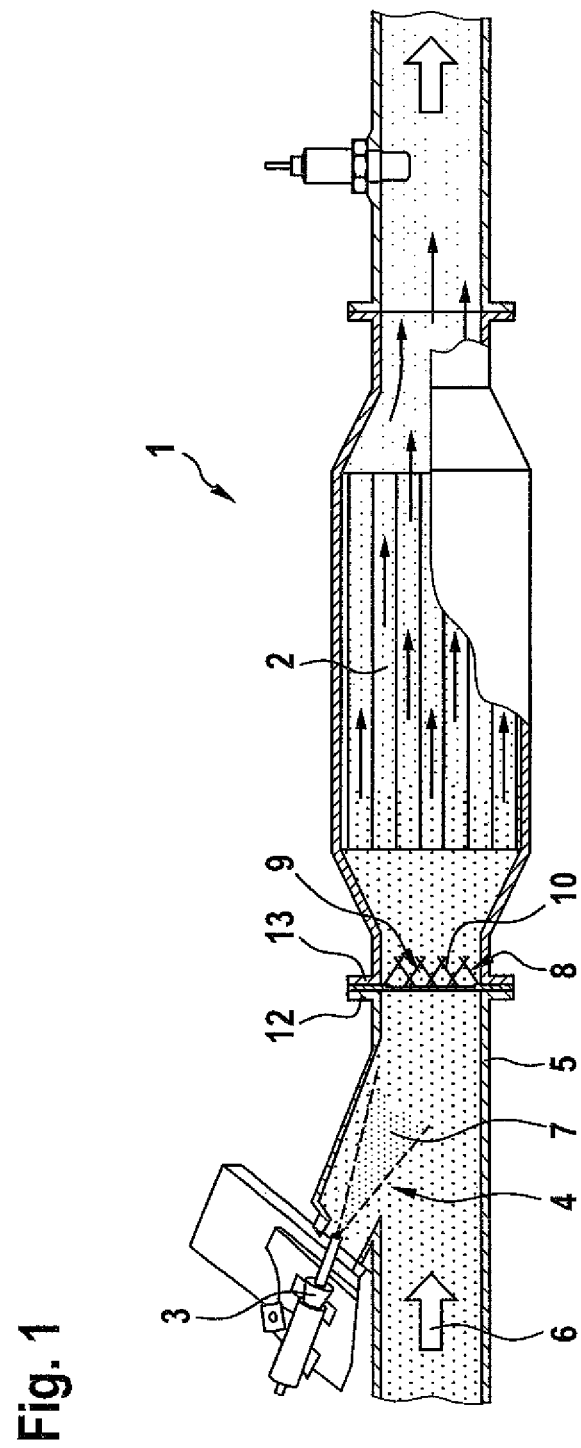
FIG. 1 is a schematic illustration of an exhaust aftertreatment device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an exhaust aftertreatment device according to the present invention, generally designated by reference numeral 1 for aftertreatment or purification of exhaust gas produced by a not shown internal combustion engine. The exhaust aftertreatment device 1 includes an SCR catalyst 2 and a reductant feeding apparatus 3 by which reductant can be injected using, for example, an injector at an entry point 4 into an exhaust pipe 5 and exhaust gas flowing through the exhaust pipe 5. Arrow 6 designates the flow direction of the exhaust gas in the exhaust pipe 5.

Figure 2:
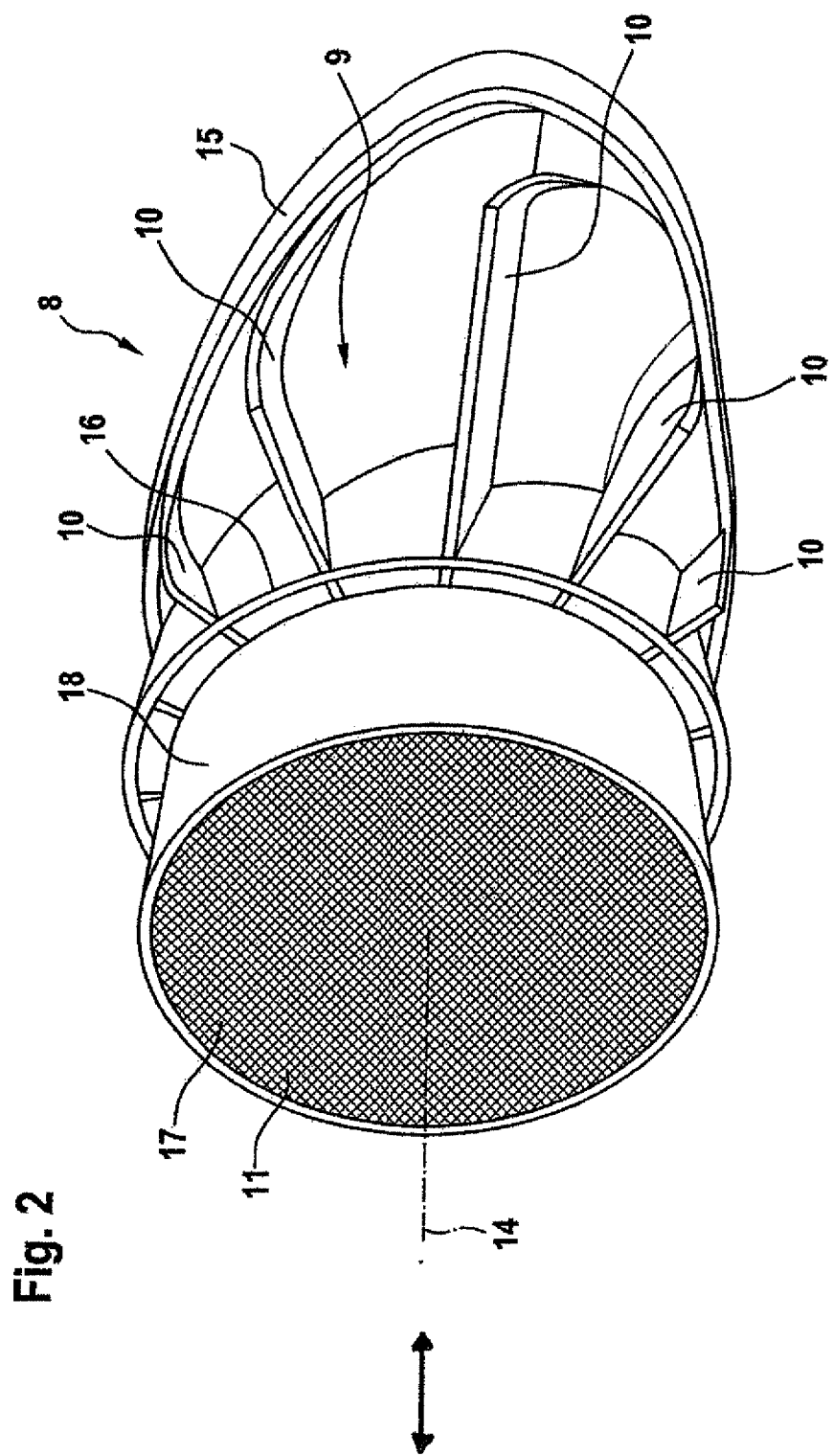
FIG. 2 is an enlarged detailed view of a mixing apparatus of the exhaust aftertreatment device of FIG. 1.

As is readily apparent, the reductant is injected in the form of a spray cone 7 which expands in flow direction of the exhaust gas. Arranged in flow direction between the entry point 4 and the SCR catalyst 2 is a mixing apparatus 8 which includes a mixing element 9 with several mixing vanes 10 and a catalyst element 11 which is not discernible in FIG. 1 but shown in FIG. 2. For example, the mixing element 9 may be held between flanges 12, 13, with flange 12 being connected to the exhaust pipe 5 while flange 13 is a component of the SCR catalyst 2. The mixing apparatus 8 assumes the task of mixing the reductant, introduced by the feeding apparatus 3, with exhaust gas flowing through the exhaust pipe 5.

As the selective catalytic reduction in the SCR catalyst 2 becomes more efficient as the mixing of the reductant with exhaust gas becomes more thorough, the mixing apparatus 8 is configured in accordance with the present invention such as to attain a highly effective thorough mixing of reductant with exhaust gas. The mixing apparatus 8 will now be described with reference to FIG. 2, which depicts the mixing apparatus 8 in greater detail. The mixing apparatus 8 defines a longitudinal center axis 14. The mixing vanes 10 extend outwards in radial direction in relation to the longitudinal center axis 14 and are configured with a flow-enhancing profile, i.e. in the form of an aerofoil. In addition, the mixing vanes 10 are curved about their respective longitudinal center axis so as to impose a swirl about the longitudinal center axis 14 upon the passing exhaust gas and/or reductant. The mixing vanes 10 are secured on their outer side, as viewed in radial direction, to a circumferential fastening ring 15 which is shaped in conformity with an inner cross sectional shape of the exhaust pipe 5.

Using the fastening ring 15, the mixing apparatus 8 is secured to the flanges 12, 13 in particular. The mixing element 9 of the mixing apparatus 8 is hereby located downstream in flow direction of the exhaust gas, so that the catalyst element 11 projects into the exhaust pipe 5. A reverse arrangement is, of course, also possible, as shown by the double-headed arrow in FIG. 2, where the catalyst element 11 can be arranged downstream of the mixing element 9. The mixing vanes 10 are secured to both the fastening ring 15 and a reinforcing ring 16 on an opposite end of the mixing element 9. The mixing vanes 10 extend advantageously in radial direction from the reinforcing ring 16 to the fastening ring 15 and in addition from the reinforcing ring 16 in radial direction inwardly in the direction of the catalyst element 11.

Whereas the fastening ring 15 has advantageously an oval shape in cross section in relation to the longitudinal center axis 14, the reinforcing ring 16 is round and defined by a diameter in correspondence with the smallest dimensions of the fastening ring 15 in radial direction. As is readily apparent, the catalyst element 11 is arranged in a central mount 17 which is provided, for example, in a bracket 18 for the catalyst element 11. The bracket 18 can be cylindrical in shape, in particular circular-cylindrical in shape, and may rest upon the mixing vanes 10 in axial direction and/or secured to the mixing vanes 10.

It may also be conceivable that the mixing vanes 10 extend in radial direction only to the bracket 18 so that the region immediately behind the catalyst element 11, as viewed in flow direction, is not traversed by the mixing vanes 10. Currently preferred is, however, a configuration in which the mixing vanes 10 extend to the longitudinal center axis 14 and secured there to one another. Using such a configuration enables the exhaust gas together with the reductant to flow through the catalyst element 11 first and then to pass the mixing element 9 and its mixing vanes 10 to impose a swirl upon the exhaust and/or the reductant.

The reductant feeding apparatus 3 is advantageously oriented such that the afore-described spray cone 7 fully impacts the catalyst element 11, at least in the presence of a particular exhaust gas mass flow, advantageously however in the presence of all mass flows encountered during normal operation of the exhaust aftertreatment device 1. Thus, substantially only exhaust gas flows through the region of the mixing vanes 10 outside of the reinforcing ring 16 in radial direction, whereas a mixture of exhaust gas and reductant flows through the catalyst element 11.

In the catalyst element 11, which can be configured as SCR catalyst element 11, part of the reactions can be executed which otherwise would take place only in the SCR catalyst 2. As a result, efficiency of the SCR catalyst 2 is greatly improved, because injected reductant is broken down in its entirety or at least in part, before reaching the SCR catalyst 2 together with the exhaust gas.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An exhaust aftertreatment device for aftertreatment of exhaust gas of an internal combustion engine, comprising
an SCR catalyst for selective catalytic reduction;

a feeding apparatus for adding a reductant at an entry point upstream of the SCR catalyst to the exhaust gas; and a mixing apparatus having a longitudinal center axis and arranged in a flow direction of the exhaust gas between the entry point and the SCR catalyst, said mixing apparatus including a mixing element and a catalyst element, with the catalyst element having in the flow direction of the exhaust gas a cross sectional area which is smaller than a cross sectional area of the mixing element, wherein the catalyst element is secured directly onto the mixing element, wherein the mixing element includes mixing vanes having inner sides and outer sides and extending outwards in a radial direction in relation to the longitudinal center axis, said mixing vanes secured on their respective inner sides in the radial direction directly onto the catalyst element or the catalyst element is arranged and secured in a mount in the mixing element connected to the respective inner sides of the mixing vanes.

2. The exhaust aftertreatment device of claim 1, wherein the catalyst element is arranged upstream of the mixing element.

3. The exhaust aftertreatment device of claim 1, wherein the catalyst element is arranged downstream of the mixing element.

4. The exhaust aftertreatment device of claim 1, wherein the catalyst element is directly secured to the mixing element.

5. The exhaust aftertreatment device of claim 1, wherein the mixing element surrounds the catalyst element in a circumferential direction with at least one section or its entirety.

6. The exhaust aftertreatment device of claim 1, wherein the mixing element is sized to extend beyond the catalyst element with respect to a radial direction.

7. The exhaust aftertreatment device of claim 1, wherein the mixing vanes are curved about their respective longitudinal center axis so as to impose a swirl upon the exhaust gas or reductant.

8. The exhaust aftertreatment device of claim 1, wherein the catalyst element has a round cross section or the mixing element has a non-round cross section.

9. The exhaust aftertreatment device of claim 1, wherein the mixing element has an oval cross section.

10. The exhaust aftertreatment device of claim 1, wherein the catalyst element is an SCR catalyst element.

11. The exhaust aftertreatment device of claim 1, wherein the feeding apparatus is oriented to point toward the catalyst element.

12. The exhaust aftertreatment device of claim 1, wherein the injector is configured to inject the redundant in a shape of a spray cone which is enclosed by the catalyst element in the presence of at least one exhaust mass flow.

* * * * *